United States Patent [19]
Chen

[11] Patent Number: 5,799,798
[45] Date of Patent: Sep. 1, 1998

[54] SCREEN CYLINDER FOR SCREENING HIGH CONSISTENCY PULP

[76] Inventor: Chao-Ho Chen, Pei-Shan Chuang No. 2, Fu-Chu Tsun, Ta-An Hsiang, Taichung Hsien, Taiwan

[21] Appl. No.: 701,835

[22] Filed: Aug. 23, 1996

[51] Int. Cl.$^6$ .................................................. B07B 1/20
[52] U.S. Cl. .................. 209/306; 209/305; 209/300; 209/273; 209/393; 162/251; 162/55
[58] Field of Search ...................... 209/273, 300, 209/305, 306, 393; 162/55, 251

[56] References Cited

U.S. PATENT DOCUMENTS

| | | | |
|---|---|---|---|
| 5,090,721 | 2/1992 | Lange | 220/485 |
| 5,094,360 | 3/1992 | Lange | 209/411 |
| 5,200,072 | 4/1993 | Frejborg et al. | 210/232 |
| 5,394,600 | 3/1995 | Chen | 209/393 |

FOREIGN PATENT DOCUMENTS

| | | |
|---|---|---|
| 2061290 | 6/1992 | Canada . |
| 58-209434 | 6/1983 | Japan . |

*Primary Examiner*—Joseph E. Valenza
*Assistant Examiner*—Mark Deuble
*Attorney, Agent, or Firm*—Merchant, Gould, Smith, Edell, Welter & Schmidt

[57] ABSTRACT

A screen cylinder is adapted to be used with a stirring unit for screening high consistency pulp to be received in the screen cylinder. The screen cylinder includes a plurality of parallel supporting plates, each of which is formed with a plurality of transversely and spacedly arranged mounting grooves. The mounting grooves on one of the supporting plates is aligned with the mounting grooves on an adjacent one of the supporting plates. Each of a plurality of parallel elongated bars has a longitudinal constricted mounting portion to be tightly gripped by the supporting plates in the mounting grooves. Each elongated bar further has a longitudinal head portion on one end of the constricted mounting portion and a pair of longitudinal ribs which extend respectively from opposite sides of the head portion adjacent to the constricted mounting portion. The head portion has a flat end face and an opposite pair of concave side faces which extend inwardly from the end face to a respective one of the longitudinal ribs.

3 Claims, 6 Drawing Sheets

SCREEN CYLINDER FOR SCREENING HIGH CONSISTENCY PULP

BACKGROUND OF THE INVENTION

1. Field of the Invention

The invention relates to a screen cylinder, more particularly to a screen cylinder for screening high consistency pulp.

2. Description of the Related Art

Referring to FIG. 1, a conventional screen assembly for screening pulp is shown to comprise a screen cylinder 10 and a stirring unit 11 provided in the screen cylinder 10 for stirring pulp in the screen cylinder 10. The screen cylinder 10 includes a cylindrical screen plate 12 and is capable of retaining large particles therein. As shown in FIG. 2, the screen plate 12 is cut with a plurality of generally axially extending, circumferentially spaced contoured slots, each of which has an inlet portion 121 on an inner surface of the screen plate 12, an outlet portion 122 on an outer surface of the screen plate 12, and a restricted channel portion 123 extending between the inlet and outlet portions 121, 122.

When the stirring unit 11 is activated to agitate the pulp in the screen cylinder 10, the pulp is forced to flow into the slots at the inlet portions 121. As shown in FIGS. 3(a) and 3(b), since the inlet portion 121 of each slot is formed by cutting at the inner surface of the screen plate 12, the size (A) of the inlet portion 121 at the inner surface of the screen plate 12 is normally equal to or greater than the size (B) of the inlet portion 121 adjacent to the restricted channel portion 123. Therefore, when pulp flows into the inlet portions 121 while being agitated by the stirring unit 11, some of the pulp will simply slide along the walls that define the inlet portions 121, thereby resulting in a reverse pulp flow. The problem of reverse pulp flow is further aggravated by a suction effect that is generated whenever tail portions of stirring blades of the stirring unit 11 pass over the inlet portions 121 of the slots. Reverse pulp flow limits the amount of pulp that can smoothly flow through the slots of the screen plate 12. Thus, the conventional screen cylinder 10 is not suitable for use in screening high consistency pulp since a higher processing cost is incurred due to the longer screening time requirement.

In U.S. Pat. No. 5,394,600 by the applicant of this invention, there is disclosed a method of making a screen cylinder which includes the steps of: arranging spacedly a plurality of elongated supporting plates, each of which is formed with a plurality of transversely and spacedly arranged grooves, in a parallel manner to align the grooves on one of the supporting plates with those on an adjacent one of the supporting plates; preparing a plurality of elongated bars, each of which is integrally formed with a longitudinal constricted portion, the constricted portion having a transverse width wider than that of the grooves on the supporting plates; heating the supporting plates to expand the grooves; inserting the constricted portions of the elongated bars into the expanded grooves of the supporting plates in order to juxtapose in parallel the elongated bars and to form slots of the screen cylinder therebetween; cooling the supporting plates in order to contract the supporting plates and the grooves so as to hold tightly the elongated bars therein; and rolling the cooled supporting plates and the elongated bars in order to form the screen cylinder.

Although the aforementioned U.S. Patent provides an improved manufacturing method which results in quick and convenient production of relatively strong screen cylinders, the screen cylinders disclosed therein still suffer from the problem of reverse pulp flow and are thus unsuited for use in screening high consistency pulp.

SUMMARY OF THE INVENTION

Therefore, the object of the present invention is to provide a high strength screen cylinder which can be quickly and conveniently manufactured and which can be used to screen high consistency pulp in an efficient manner.

Accordingly, the screen cylinder of the present invention is adapted to be used with a stirring unit for screening high consistency pulp that is received in the screen cylinder. The screen cylinder comprises a plurality of parallel supporting plates, each of which is formed with a plurality of transversely and spacedly arranged mounting grooves. The mounting grooves on one of the supporting plates is aligned with the mounting grooves on an adjacent one of the supporting plates. The screen cylinder further comprises a plurality of parallel elongated bars, each of which has a longitudinal constricted mounting portion to be tightly gripped by the supporting plates in the mounting grooves. Each elongated bar further has a longitudinal head portion on one end of the constricted mounting portion, and a pair of longitudinal ribs which extend respectively from opposite sides of the head portion adjacent to the constricted mounting portion. The head portion has a flat end face and an opposite pair of concave side faces which extend inwardly from the end face to a respective one of the longitudinal ribs. Adjacent ones of the elongated bars have a longitudinal slot formed therebetween. The slot has a narrower inlet portion between the end faces of the adjacent elongated bars, a wider receiving portion between the concave side faces of the adjacent elongated bars, a restricted channel portion between the longitudinal ribs of the adjacent elongated bars, and an outlet portion between the constricted mounting portions of the adjacent elongated bars. When the stirring unit agitates the pulp in the screen cylinder to force the pulp to flow into the slots, the inner portions of the slots can minimize reverse pulp flow to result in smooth flow of the pulp through the slots without need for diluting the pulp.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
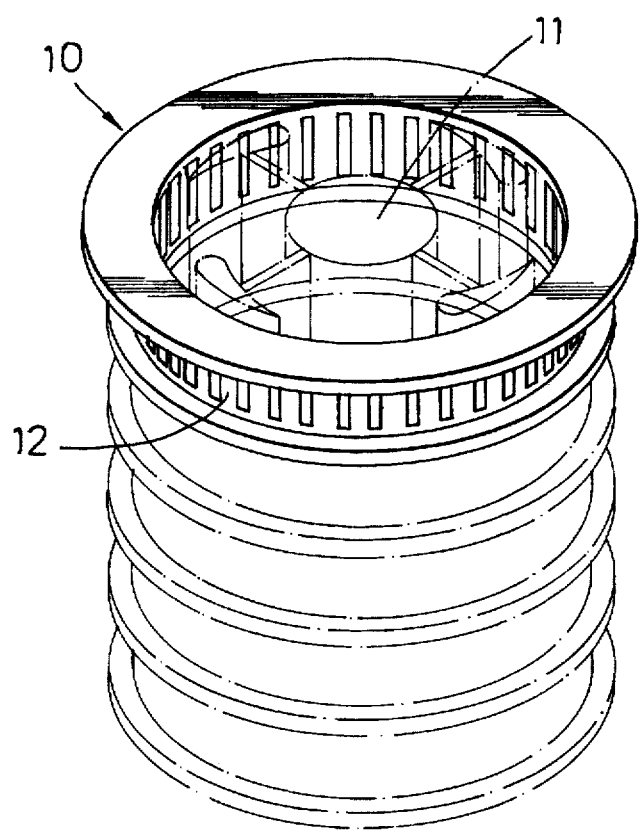
FIG. 1 is a perspective view illustrating a conventional screen assembly which includes a screen cylinder and a stirring unit.
Figure 2:
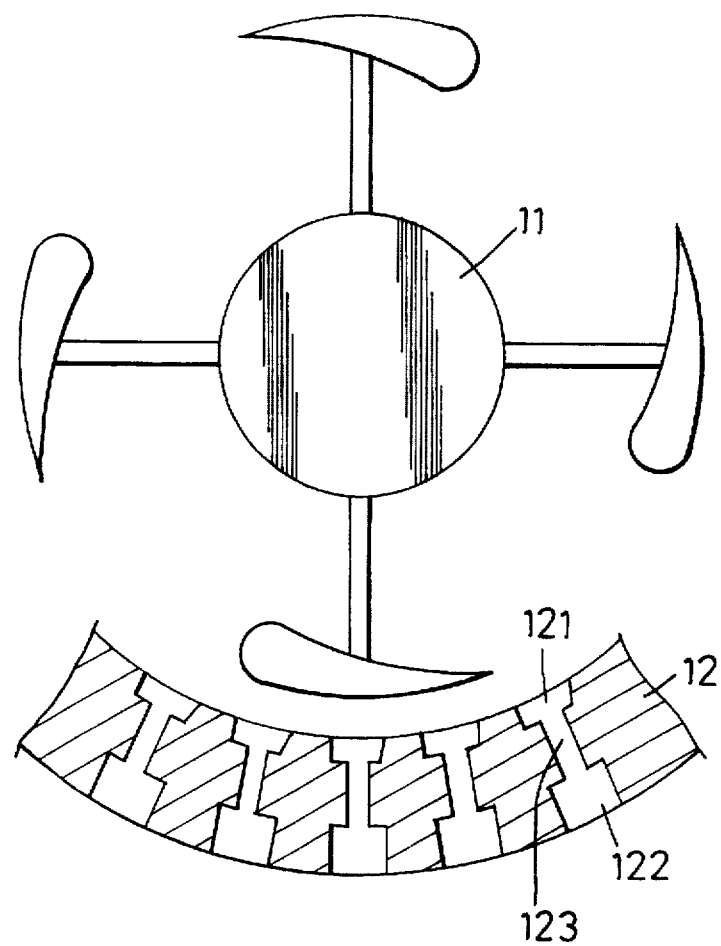
FIG. 2 illustrates the stirring unit and a section of the screen cylinder shown in FIG. 1.
Figure 3A:
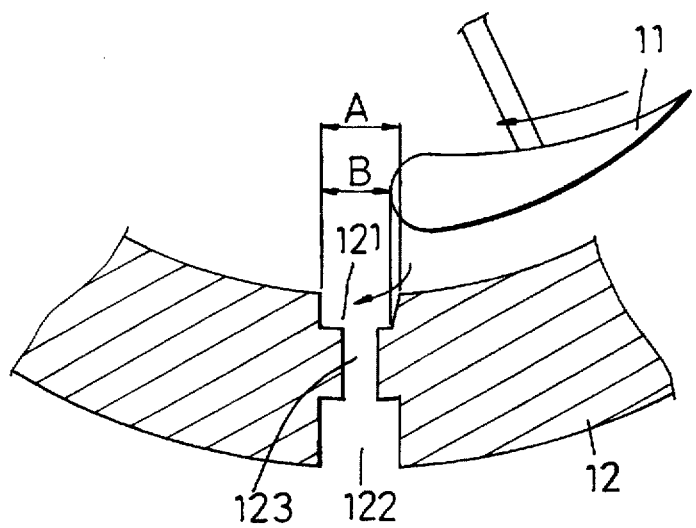
FIGS. 3(a) and 3(b) illustrate how pulp flows out of the conventional screen cylinder.
Figure 3B:
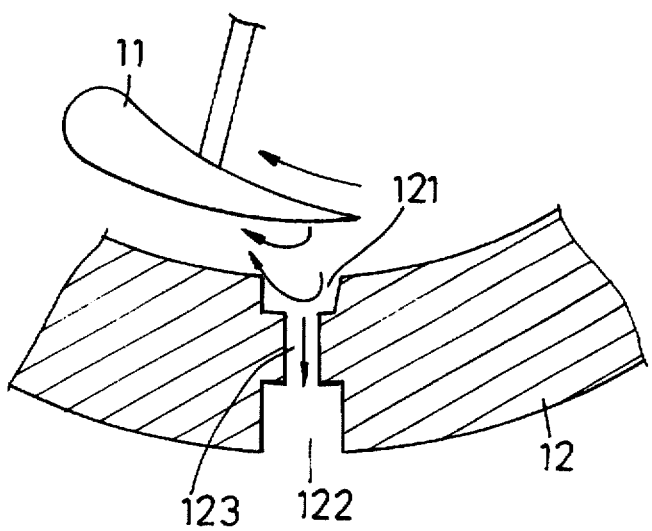
Figure 4:
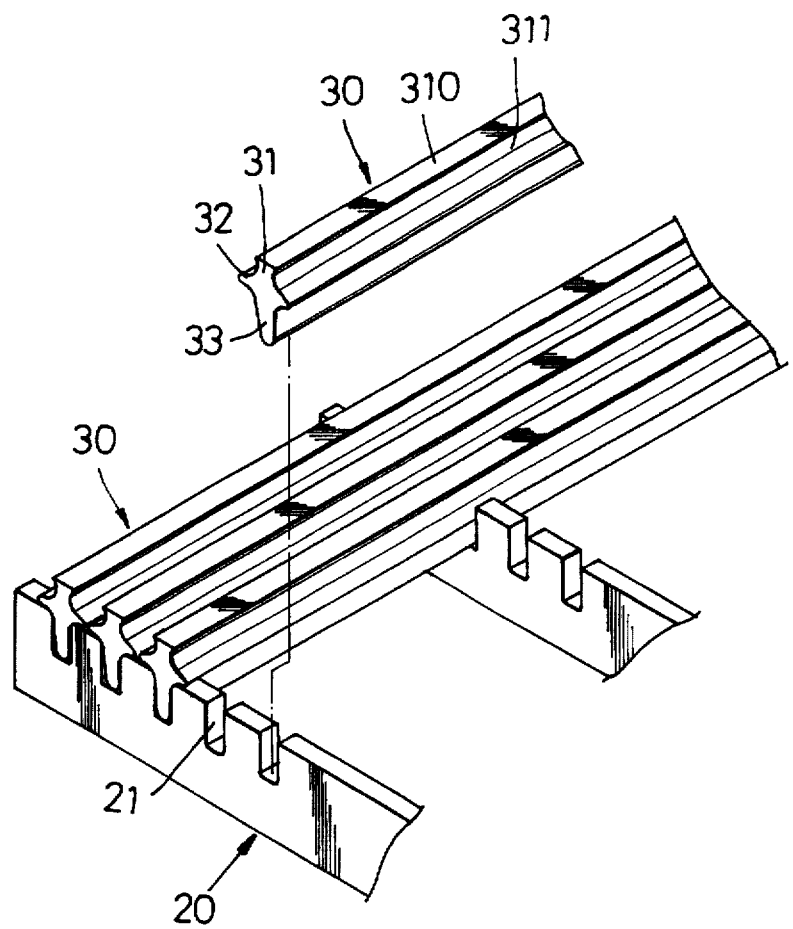
FIG. 4 is a perspective view which illustrates how the preferred embodiment of a screen cylinder according to the present invention is manufactured.
Figure 5:
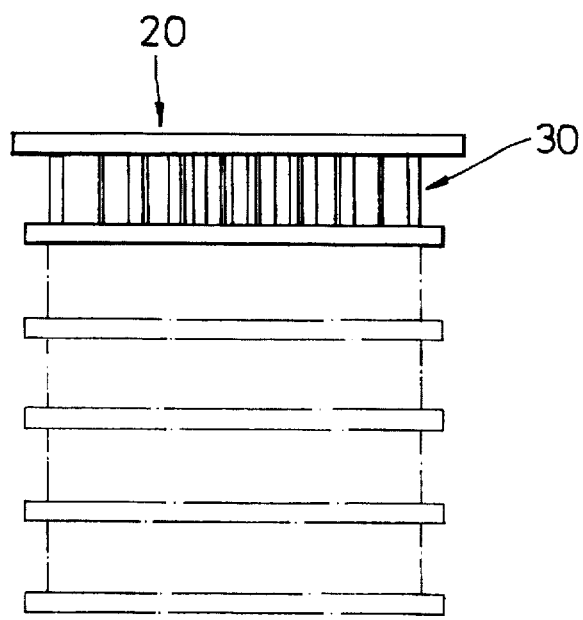
FIG. 5 is a schematic side view of the preferred embodiment.

Referring to FIG. 4, the preferred embodiment of a screen cylinder according to the present invention is shown to comprise a plurality of elongated supporting plates 20 and a plurality of elongated bars 30. Each of the supporting plates 20 is formed with a plurality of transversely and spacedly arranged mounting grooves 21. Each of the elongated bars 30 has a longitudinal constricted mounting portion 33 to be tightly gripped by the supporting plates 20 in the mounting grooves 21. The method for manufacturing the screen cylinder of the present invention is generally similar to that of U.S. Pat. No. 5,394,600 which was described beforehand. Initially, the supporting plates 20 are arranged spacedly in a parallel manner to align the mounting grooves 21 on one of the supporting plates 20 with those on an adjacent one of the supporting plates 20. The supporting plates 20 are then heated to expand the mounting grooves 21 so that the constricted mounting portions 33, which have a transverse width wider than that of the mounting grooves 21, of the elongated bars 30 can be inserted into the expanded grooves 21 in order to juxtapose in parallel the elongated bars 30 and to form slots of the screen cylinder therebetween. Subsequently, the supporting plates 20 are cooled in order to contract the supporting plates 20 and the mounting grooves 21 so as to hold tightly the elongated bars 30 therein. Finally, the cooled supporting plates 20 and the elongated bars 30 are rolled in order to form a cylinder body, and the two ends of the cylinder body are welded together to complete manufacture of the screen cylinder, as shown in FIG. 5.

The screen cylinder of the present invention is characterized by the improved configuration of the elongated bars 30. As illustrated, aside from the longitudinal constricted mounting portion 33, each elongated bar 30 further has a longitudinal head portion 31 on one end of the constricted mounting portion 33 and a pair of longitudinal ribs 32 which extend respectively from opposite sides of the head portion 31 adjacent to the constricted mounting portion 33. The head portion 31 has a flat end face 310 and an opposite pair of concave side faces 311 which extend inwardly from the end face 310 to a respective one of the longitudinal ribs 32.

Figure 6A:
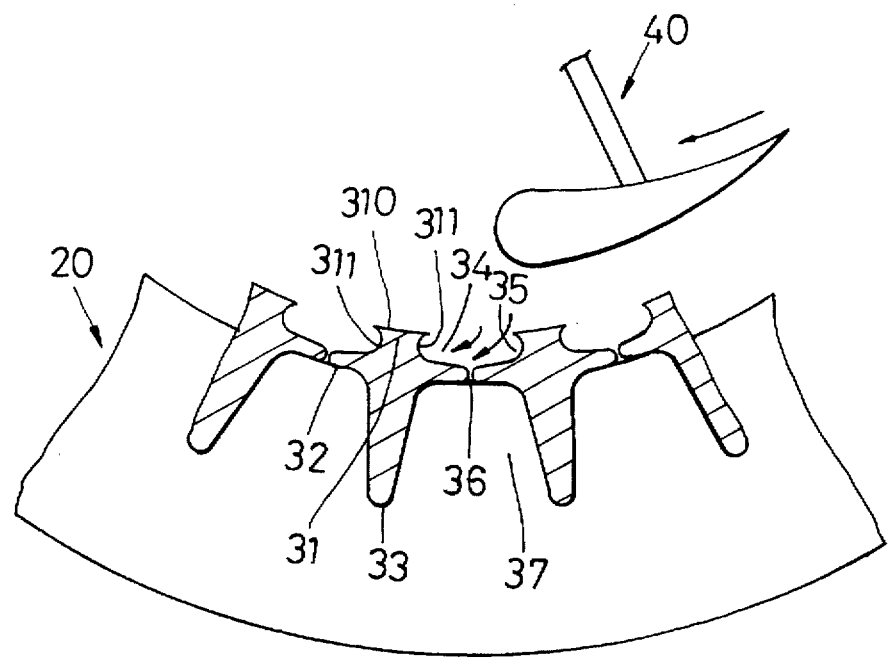
FIGS. 6(a) and 6(b) illustrate how the preferred embodiment is used in combination with a stirring unit to screen high consistency pulp in an efficient manner.
Figure 6B:
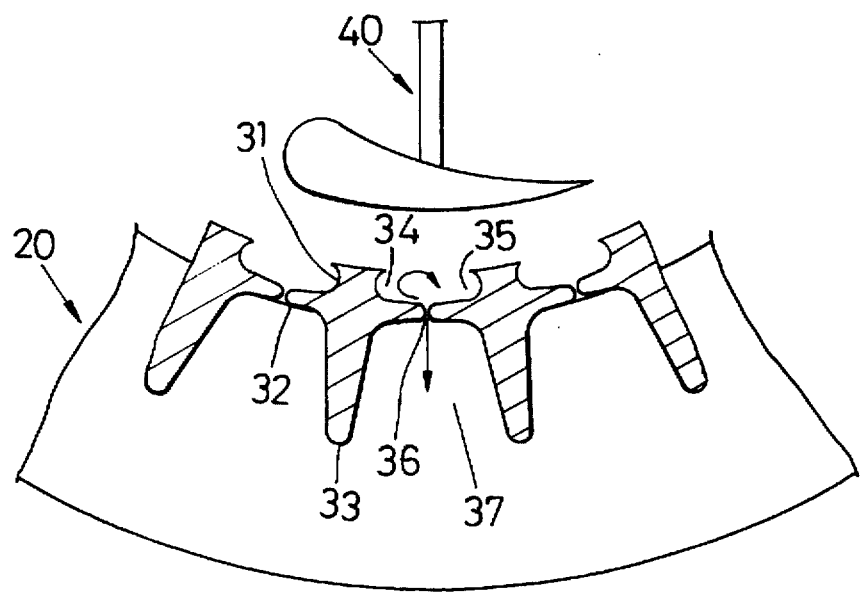

Referring to FIGS. 6(a) and 6(b), when the screen cylinder of the present invention is formed, adjacent ones of the elongated bars 30 have a longitudinal slot formed therebetween. Each slot has a narrower inlet portion 34 between the end faces 310 of the adjacent elongated bars 30, a wider receiving portion 35 between the concave side faces 311 of the adjacent elongated bars 30, a restricted channel portion 36 between tips of the longitudinal ribs 32 of the adjacent elongated bars 30, and an outlet portion 37 between the constricted mounting portions 33 of the adjacent elongated bars 30.

In use, a stirring unit 40 is disposed in the screen cylinder for agitating pulp that is received in the latter. When activated, the stirring unit 40 forces the pulp to flow into the receiving portions 35 of the slots via the inlet portions 34. Since the inlet portion 34 of each slot is narrower than the respective receiving portion 35, the pulp which slide along the concave side faces 311 are guided into the restricted channel portions 36 and exit the screen cylinder at the outlet portions 37 of the slots. Moreover, the narrower inlet portions 34 can diminish the suction effect that is generated whenever the tail portions of stirring blades of the stirring unit 40 pass over the inlet portions 34 of the slots. Thus, the presence of a reverse pulp flow can be avoided by the inlet portions 34 in the screen cylinder of the present invention to result in a large amount of pulp that can smoothly flow through the slots of the screen cylinder without the need for diluting the pulp.

Since the present invention is manufactured in a manner similar to that disclosed in the aforementioned U.S. Pat. No. 5,394,600, quick and convenient production of high strength screen cylinders of this invention can be attained. In addition, the screen cylinder of the present invention is ideal for use in screening high consistency pulp in view of the lower processing cost that is incurred due to the shorter screening time requirement.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A screen cylinder adapted to be used with a stirring unit for screening high consistency pulp to be received in said screen cylinder, said screen cylinder comprising:

a plurality of parallel supporting plates, each of which is formed with a plurality of transversely and spacedly arranged mounting grooves, said mounting grooves on one of said supporting plates being aligned with said mounting grooves on an adjacent one of said supporting plates; and a plurality of parallel elongated bars, each of which has a longitudinal constricted mounting portion to be tightly gripped by said supporting plates in said mounting grooves, each of said elongated bars further having a longitudinal head portion on one end of said constricted mounting portion and a pair of longitudinal ribs which extend respectively from opposite sides of said head portion adjacent to said constricted mounting portion, said head portion having a flat end face and an opposite pair of concave side faces which extend inwardly from said end face to a respective one of said longitudinal ribs;

adjacent ones of said elongated bars having a longitudinal slot formed therebetween, said slot having a narrower inlet portion between said end faces of said adjacent ones of said elongated bars, a wider receiving portion between said concave side faces of said adjacent ones of said elongated bars, a restricted channel portion between said longitudinal ribs of said adjacent ones of said elongated bars, and an outlet portion between said constricted mounting portions of said adjacent ones of said elongated bars;

whereby, when the stirring unit agitates the pulp in said screen cylinder to force the pulp to flow into said slots, said inner portions of said slots can minimize reverse pulp flow to result in smooth flow of the pulp through said slots without need for diluting the pulp.

2. The screen cylinder as claimed in claim 1, wherein said constricted mounting portions of said elongated bars have a transverse width wider than that of said mounting grooves on said supporting plates, said supporting plates being heated to expand said mounting grooves so that said constricted mounting portions of said elongated bars can be inserted into the expanded mounting grooves, said supporting plates being subsequently cooled in order to contract said supporting plates and said mounting grooves so as to hold tightly said elongated bars therein.

3. The screen cylinder as claimed in claim 2, wherein said supporting plates and said elongated bars are rolled in order to form a cylinder body which has two ends that are welded together.

* * * * *